(12) United States Patent
Inoue

(10) Patent No.: US 8,572,805 B2
(45) Date of Patent: Nov. 5, 2013

(54) GROMMET

(75) Inventor: Yasuhiko Inoue, Yokohama (JP)

(73) Assignee: Nifco Inc., Yokohama-Shi (JP)

( * ) Notice: Subject to any disclaimer, the term of this patent is extended or adjusted under 35 U.S.C. 154(b) by 0 days.

(21) Appl. No.: 13/317,935

(22) Filed: Nov. 1, 2011

(65) Prior Publication Data

US 2012/0110781 A1    May 10, 2012

(30) Foreign Application Priority Data

Nov. 2, 2010  (JP) ................................ 2010-246552

(51) Int. Cl.
  *F16L 5/00*  (2006.01)
(52) U.S. Cl.
  USPC ........................ 16/2.1; 174/152 G; 174/153 G
(58) Field of Classification Search
  USPC ............... 16/2.1, 2.2, 2.5; 174/152 G, 153 G; 248/56; 411/182, 508, 913; 24/297
  See application file for complete search history.

(56) References Cited

U.S. PATENT DOCUMENTS

| 4,117,998 | A | * | 10/1978 | Notoya .......................... 248/56 |
| 4,344,205 | A | * | 8/1982 | Latino et al. .................... 16/2.1 |
| 4,640,984 | A | * | 2/1987 | Kalbfeld ....................... 174/135 |
| 5,537,714 | A | * | 7/1996 | Lynch et al. ..................... 16/2.1 |
| 7,222,394 | B2 | * | 5/2007 | Gardner ......................... 16/2.1 |
| 7,355,130 | B2 | * | 4/2008 | Holman et al. ............... 174/658 |
| 7,390,979 | B1 | * | 6/2008 | Johnson ....................... 174/655 |
| D583,650 | S | * | 12/2008 | Moerke ........................ D8/356 |
| 8,261,409 | B2 | * | 9/2012 | Magennis et al. ............... 16/2.1 |

FOREIGN PATENT DOCUMENTS

JP  2010-078065  4/2010

* cited by examiner

*Primary Examiner* — William Miller
(74) *Attorney, Agent, or Firm* — Manabu Kansesaka

(57) ABSTRACT

A grommet for fixing an object such as a cable along a groove portion of a channel-type steel material can be fixed or freely stopped by using lips of the channel-type steel material. A grommet includes a base leg portion and a flange portion. The base leg portion includes elastic leg pieces elastically protruding toward an outside, bent toward an inside by being pressed by lips when inserted into an inside of a space of the lips, and restored to original state inside a groove portion after passing through the inside of the space of the lips so as to sandwich the lips between the elastic leg pieces and the flange portion from an inside and an outside. At least either one of the base leg portion or the flange portion includes a locking device for locking the object or a locking device of the object.

9 Claims, 15 Drawing Sheets

GROMMET

BACKGROUND OF THE INVENTION AND RELATED ART STATEMENT

The present invention relates to a grommet for fixing an object and the like such as, for example, a cable and the like along a groove portion of a channel-type steel material and the like, and by using lips of the channel-type steel material, the grommet can be fixed or freely stopped.

Conventionally, there is well known a clip including a head portion capable of being inserted into an attachment hole of the other member, and a flange portion whose external shape is larger than the attachment hole (see paragraph [0021] and FIG. 1 of Japanese Unexamined Patent Application Publication No. 2010-78065: Patent Document 1).

In the conventional head portion, there is provided a claw portion elastically protruding toward an outside thereof (see paragraph [0021] and FIG. 1 of the Patent Document 1).

In the conventional flange portion, there is provided a rib protruding toward the other member (see FIG. 1 of the Patent Document 1).

However, since the conventional clip is fixed to the attachment hole of the other member, when the clip is fixed by using the lips of the channel-type steel material, there is a problem that the clip may move along the groove portion of the channel-type steel material and the like.

Thereby, each invention described in the aspects is made in view of the problem wherein the conventional technology has, and an object of the invention is as follows.

(Aspect 1)

The invention described in an aspect 1 has the following object.

Namely, the invention described in the aspect 1 sandwiches the lips between a flange portion and elastic leg pieces from an inside and an outside, so that by using the lips of the channel-type steel material, the grommet can be fixed or freely stopped.

(Aspect 2)

The invention described in an aspect 2 has the following object in addition to the object of the invention described in the aspect 1.

Namely, in the invention described in the aspect 2, the elastic leg pieces act on plural portions in a longitudinal direction of the groove portion of the channel-type steel material and the like so as to be capable of preventing inclination in the longitudinal direction of the groove portion of the channel-type steel material and the like.

(Aspect 3)

The invention described in an aspect 3 has the following object in addition to the object of the invention described in the aspect 1 or 2.

Namely, in the invention described in the aspect 3, bulging portions abut against the lips so as to be capable of preventing a movement in the longitudinal direction of the groove portion of the channel-type steel material and the like.

(Aspect 4)

The invention described in an aspect 4 has the following object in addition to the object of the invention described in the aspect 3.

Namely, in the invention described in the aspect 4, due to slits, an elastic force can be provided to the bulging portions.

As a result, according to the invention described in the aspect 4, not only the movement in the longitudinal direction of the groove portion of the channel-type steel material and the like can be prevented, but also an inserting force of a base leg portion can be reduced, and also an adjustment of an attachment position in the longitudinal direction of the groove portion of the channel-type steel material and the like can be facilitated.

(Aspect 5)

The invention described in an aspect 5 has the following object in addition to the object of the invention described in any one of the aspects 1 to 4.

Namely, in the invention described in the aspect 5, projections and the elastic leg pieces abut against front and back surfaces of the lips so as to be capable of preventing wobbling in a front and back direction of the lips.

(Aspect 6)

The invention described in an aspect 6 has the following object in addition to the object of the invention described in the aspect 5.

Namely, in the invention described in the aspect 6, due to notch portions, an elastic force can be provided to the projections.

As a result, according to the invention described in the aspect 6, not only the wobbling in the front and back direction of the lips can be prevented, but also the inserting force of the base leg portion can be reduced.

Further objects and advantages of the invention will be apparent from the following description of the invention.

SUMMARY-OF THE INVENTION

Each invention described in each aspect is made in order to achieve each aforementioned object, and characteristics of each invention will be explained hereinafter using embodiments of the invention shown in drawings.

Incidentally, symbols in parentheses show the symbols used in the embodiments of the invention, and do not limit a technical range of the present invention.

Also, figure numbers show the figure numbers used in the embodiments of the invention, and do not limit the technical range of the present invention.

(Aspect 1)

The invention described in the aspect 1 has the following characteristics.

First, for example, as shown in FIGS. 1 and 9 to 13, the invention is a grommet (10) for fixing an object (for example, cables 20) along a groove portion (32) of a channel-type steel material (30) with lips (31) and the like.

Secondly, in the grommet (10), for example, as shown in FIGS. 1 and 9 to 13, the following structure is provided.

(1) Base Leg Portion (50)

For example, as shown in FIGS. 1 and 9 to 13, a base leg portion (50) is disposed inside the groove portion (32).

(2) Flange Portion (40)

For example, as shown in FIGS. 1 and 9 to 13, a flange portion (40) is extended from the base leg portion (50), and disposed on an outside of the groove portion (32).

Thirdly, for example, as shown in FIGS. 1, 10, and 11, in the base leg portion (50), there are provided elastic leg pieces (52) elastically protruding toward an outside, bent toward an inside by being pressed by the lips (31) when inserted into a space of the lips (31), and restored to original state inside the groove portion (32) after passing through the inside of the space of the lips (31) so as to sandwich the lips (31) between the elastic leg pieces (52) and the flange portion (40) from the inside and the outside.

Fourth, for example, as shown in FIGS. 14 and 15, at least in either one of the base leg portion (50) or the flange portion (40), there is provided a locking device (for example, a cable clamp 60) for locking the object (for example, the cables 20) or a fixing means (not shown in the figures) of the object (for example, the cables 20).

(Aspect 2)

The invention described in the aspect 2 has the following characteristics in addition to the characteristics of the invention described in the aspect 1.

Namely, for example, as shown in FIG. 1, a plurality of the elastic leg pieces (52) is provided along the groove portion (32).

(Aspect 3)

The invention described in the aspect 3 has the following characteristics in addition to the characteristics of the invention described in the aspect 1 or 2.

Namely, for example, as shown in FIGS. 1 and 11, in the base leg portion (50), bulging portions (53) bulging toward the lips (31) are provided.

(Aspect 4)

The invention described in the aspect 4 has the following characteristics in addition to the characteristics of the invention described in the aspect 3.

Namely, for example, as shown in FIG. 1, in the base leg portion (50), slits (54) are provided on a back side of the bulging portions (53).

(Aspect 5)

The invention described in the aspect 5 has the following characteristics in addition to the characteristics of the invention described in any one of the aspects 1 to 4.

Namely, for example, as shown in FIGS. 1 and 11, in the flange portion (40), projections (42) protruding toward the lips (31) are provided.

(Aspect 6)

The invention described in the aspect 6 has the following characteristics in addition to the characteristics of the invention described in the aspect 5.

Namely, for example, as shown in FIG. 1, in the flange portion (40), notch portions (43) for providing an elastic force to the projections (42) are provided between the flange portion (40) and the base leg portion (50).

Since the present invention is constituted as mentioned above, the following effects are provided.

(Aspect 1)

According to the invention described in the aspect 1, the following effect is provided.

Namely, according to the invention described in the aspect 1, the lips are sandwiched between the flange portion and the elastic leg pieces from the inside and the outside so as to be capable of fixing or freely stopping the grommet using the lips of the channel-type steel material.

(Aspect 2)

According to the invention described in the aspect 2, in addition to the effect of the invention described in the aspect 1, the following effect is provided.

Namely, according to the invention described in the aspect 2, the elastic leg pieces act on plural portions in a longitudinal direction of the groove portion of the channel-type steel material and the like so as to be capable of preventing an incline in the longitudinal direction of the groove portion of the channel-type steel material and the like.

(Aspect 3)

According to the invention described in the aspect 3, in addition to the effect of the invention described in the aspect 1 or 2, the following effect is provided.

Namely, according to the invention described in the aspect 3, the bulging portions abut against the lips so as to be capable of preventing a, movement in the longitudinal direction of the groove portion of the channel-type steel material and the like.

(Aspect 4)

According to the invention described in the aspect 4, in addition to the effect of the invention described in the aspect 3, the following effect is provided.

Namely, according to the invention described in the aspect 4, due to the slits, an elastic force can be provided to the bulging portions.

As a result, according to the invention described in the aspect 4, not only the movement in the longitudinal direction of the groove portion of the channel-type steel material and the like can be prevented, but also an inserting force of the base leg portion can be reduced, and also an adjustment of an attachment position in the longitudinal direction of the groove portion of the channel-type steel material and the like can be facilitated.

(Aspect 5)

According to the invention described in the aspect 5, in addition to the effect of the invention described in any one of the aspects 1 to 4, the following effect is provided.

Namely, according to the invention described in the aspect 5, the projections and the elastic leg pieces abut against front and back surfaces of the lips so as to be capable of preventing wobbling in a front and back direction of the lips.

(Aspect 6)

According to the invention described in the aspect 6, in addition to the effect of the invention described in the aspect 5, the following effect is provided.

Namely, according to the invention described in the aspect 6, due to the notch portions, the elastic force can be provided to the projections.

As a result, according to the invention described in the aspect 6, not only the wobbling in the front and back direction of the lips can be prevented, but also the inserting force of the base leg portion can be reduced.

DETAILED DESCRIPTION OF PREFERRED EMBODIMENTS (Grommet 10)

Figure 14:
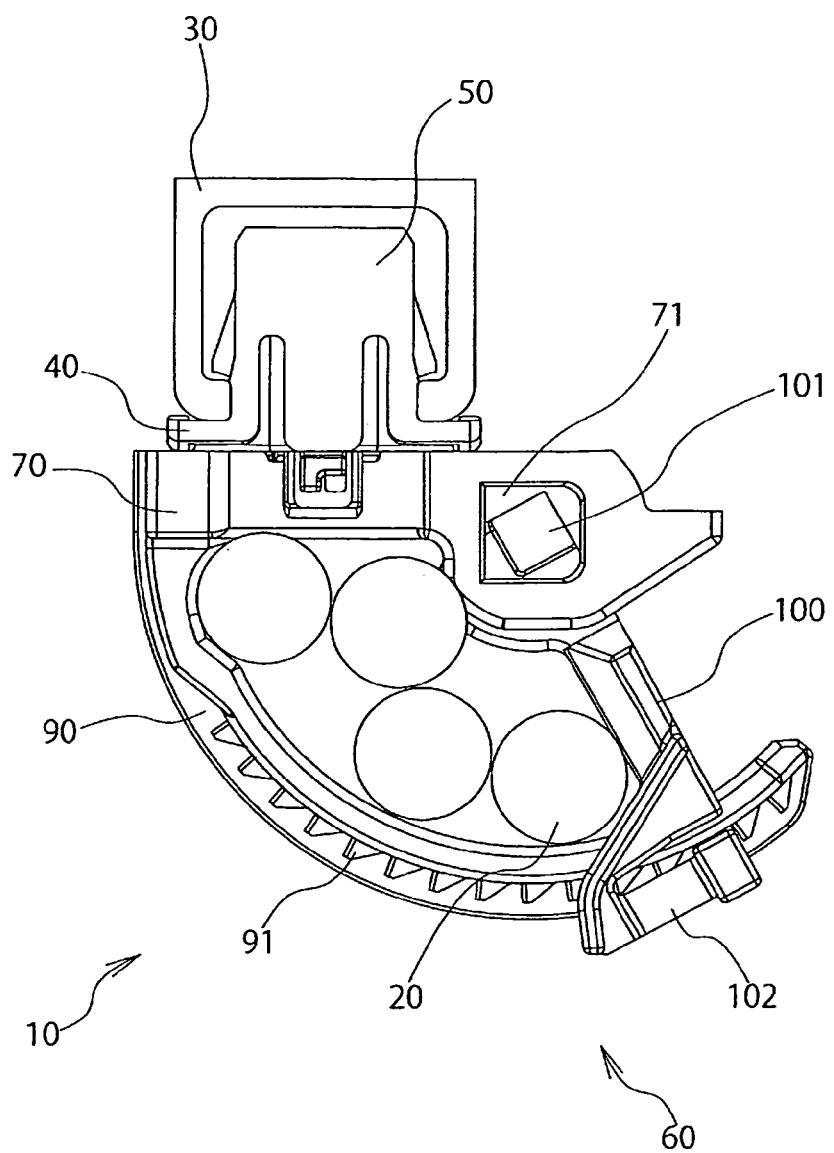
FIG. 14 is a side view of the grommet showing a holding condition of cables.
Figure 15:
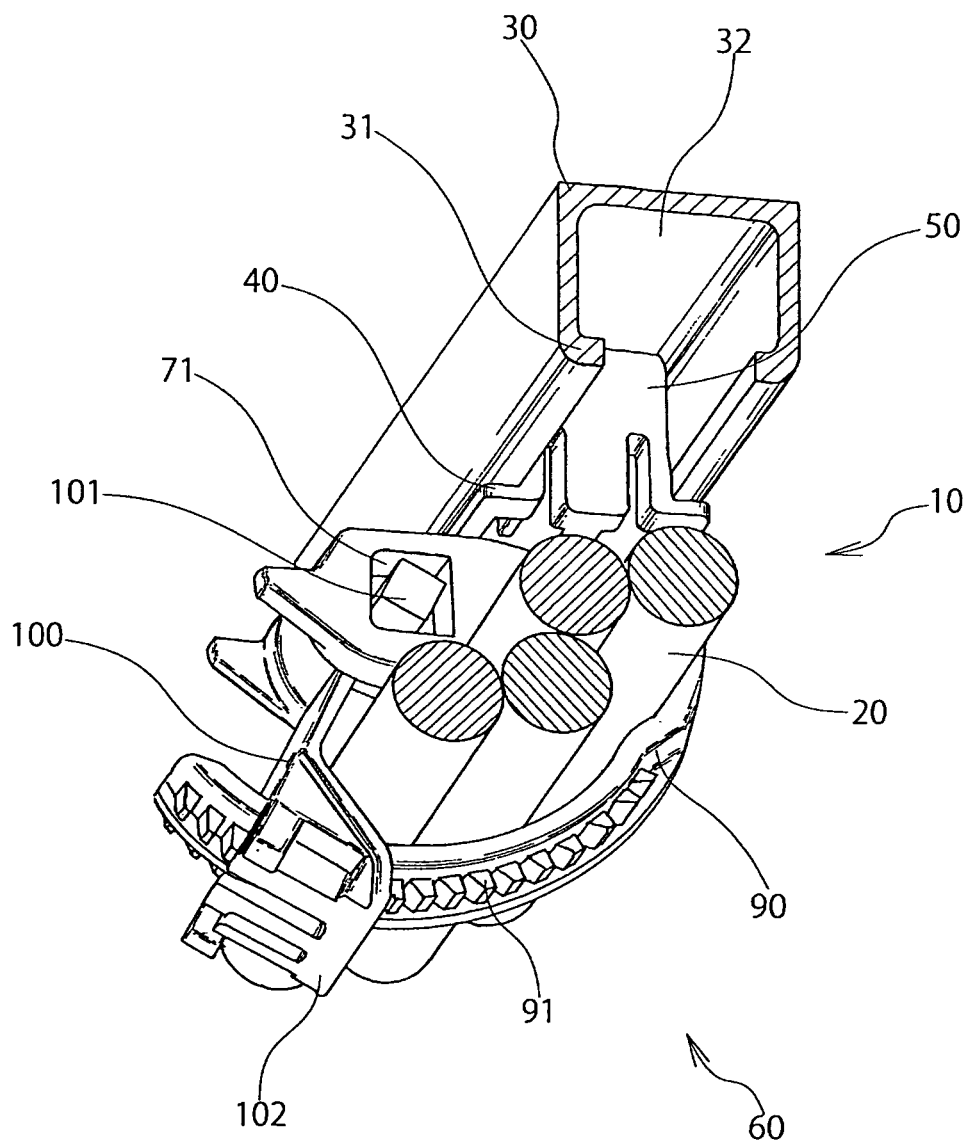
FIG. 15 is a perspective view of the grommet showing the holding condition of the cables.

In the drawings, the reference numeral 10 represents a grommet 10, and as shown in FIGS. 14 and 15, the grommet 10 is for directly fixing an object such as, for example, cables 20 and the like, or indirectly fixing the object through a fixing device (not shown in the figures) such as a holding band and the like of the cables 20 along a groove portion 32 extending in a longitudinal direction inside a long channel-type steel material 30.

Incidentally, although the cables 20 are illustrated as an example of the object, the object is not limited to the cables 20. Although the holding band is illustrated as an example of the fixing device, the fixing device is not limited to the holding band.

Figure 1:
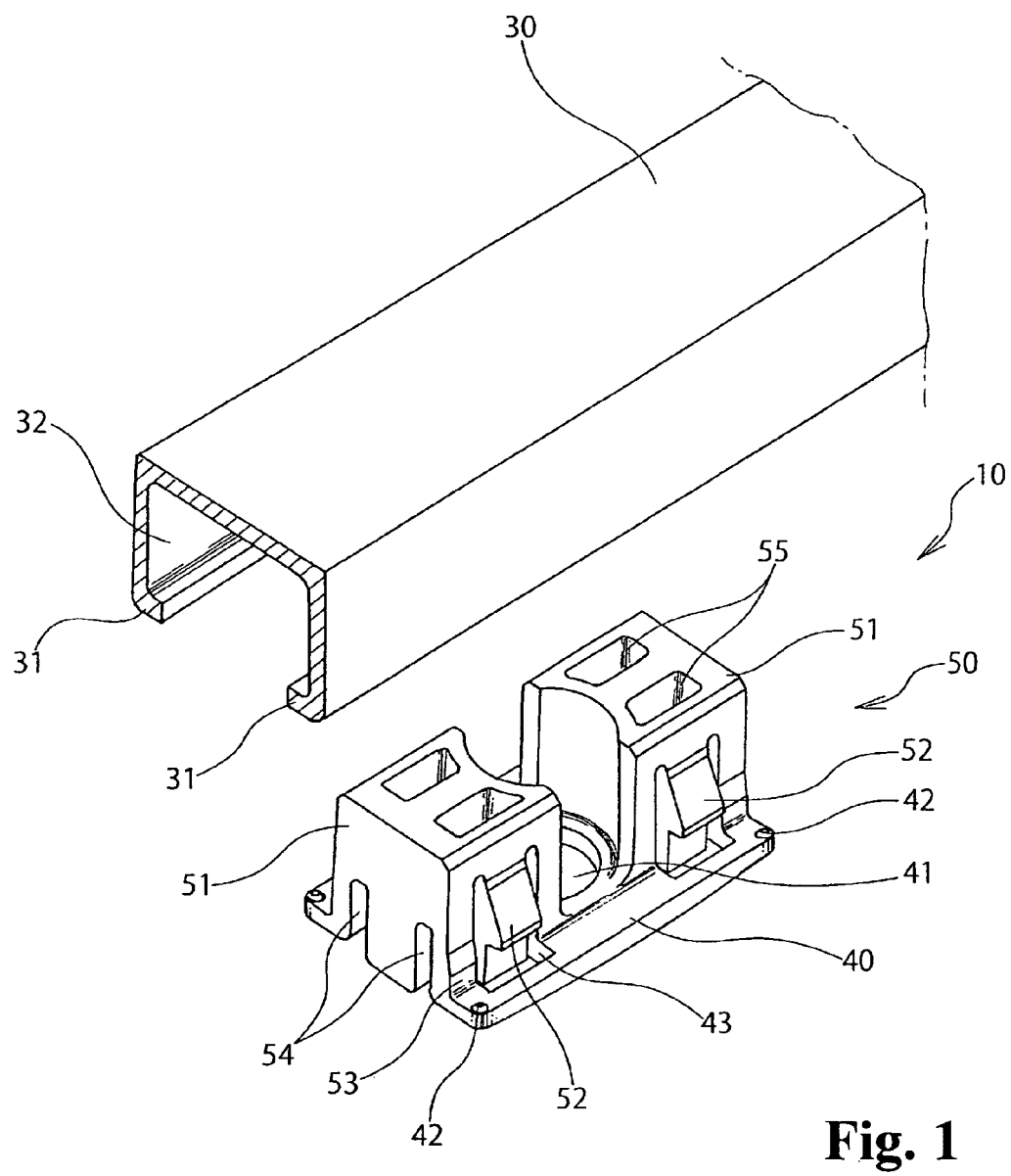
FIG. 1 is a perspective view of a grommet and a channel-type steel material.

As shown in FIG. 1, a channel-type steel material 30 has lips 31, includes a cross-sectional shape of a C shape whose lower surface is open, and is formed in a long form.

Incidentally, although the "channel-type" is illustrated as an example of the name of the steel material 30, the name of the steel material 30 is not limited to the channel-type, and may simply be a "channel", "lip channel", "C-shape (type) steel", "lip groove shape (type) steel" and the like.

The lips 31 are bent in an L shape of a cross-sectional surface from opposed lower end portions of the channel-type steel material 30, and extend while opposing each other. The mutually opposed lips 31 are positioned apart from each other, and mount the grommet 10 through an inside of a space of both the lips 31.

The groove portion 32 is positioned in a hollow inner portion of the channel-type steel material 30, and extends along the longitudinal direction inside the channel-type steel material 30. A lower surface of the groove portion 32 is open through the inside of the space of the mutually opposed lips 31.

Figure 9:
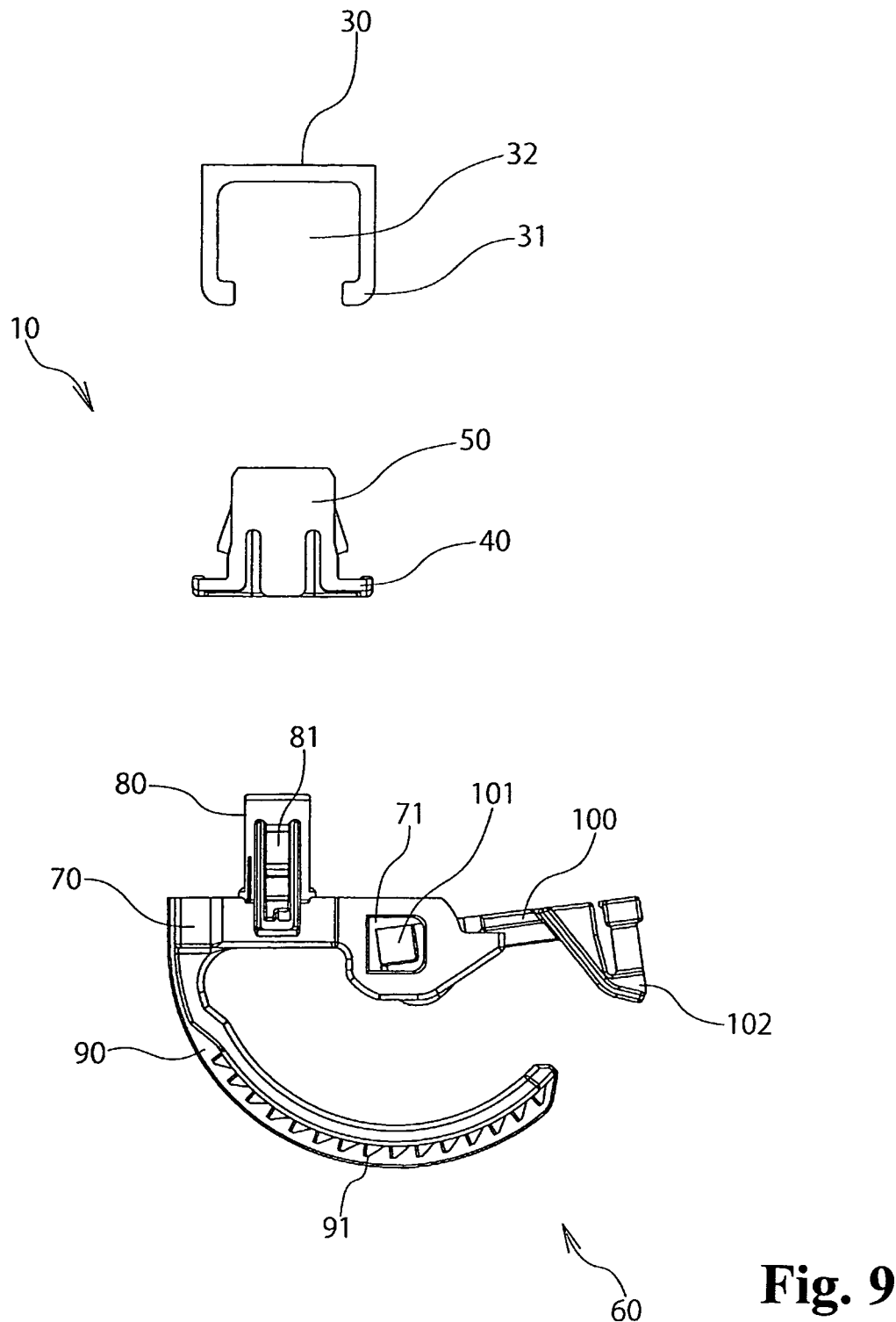
FIG. 9 is an exploded side view showing an attachment condition of the grommet.

As shown in FIGS. 1 and 9, the grommet 10 broadly comprises the following respective portions.

Incidentally, the following (1) to (3) will be explained hereinafter.

(1) Flange portion 40
(2) Base leg portion 50
(3) Cable clamp 60 (locking device)

Incidentally, each portion of the grommet 10 is not limited to the (1) to (3).

(Flange Portion 40)

As shown in FIGS. 1 and 9 to 13, the flange portion 40 is extended from the after-mentioned base leg portion 50, and disposed on an outside of the groove portion 32 of the channel-type steel material 30. The flange portion 40 is integrally formed with the base leg portion 50, and integrally formed by a thermoplastic synthetic resin such as, for example, "PBT" (polybutylene terephthalate) and the like which has appropriate elasticity and rigidity. Incidentally, although the flange portion 40 and the base leg portion 50 are integrally formed, the flange portion 40 and the base leg portion 50 are not limited to the above, and may be assembled by forming separately. Also, although the synthetic resin is illustrated as an example of a material of the flange portion 40, the material of the flange portion 40 is not limited to the synthetic resin, and the flange portion 40 may be made from metal.

The flange portion 40 is formed in a flat plate shape, and a width thereof is formed wider than that of the space of the mutually opposed lips 31.

As shown in FIGS. 1 to 8, the flange portion 40 broadly comprises the following respective portions.

Incidentally, the following (1) to (3) will be described hereinafter.

(1) Attachment hole 41
(2) Projections 42
(3) Notch portions 43

Incidentally, each portion of the flange portion 40 is not limited to the (1) to (3).

(Attachment Hole 41)

Figure 10:
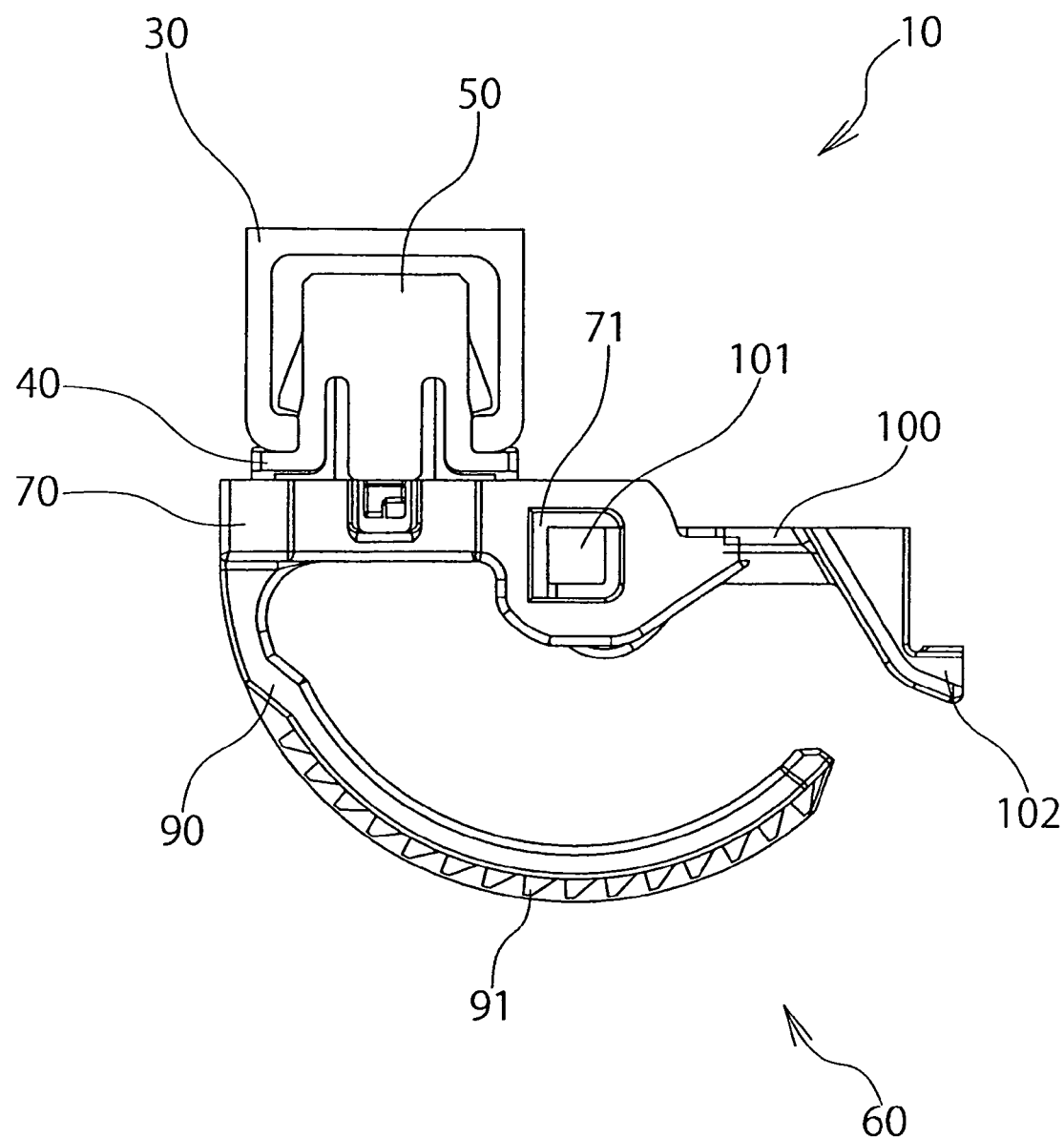
FIG. 10 is a side view showing the attachment condition of the grommet.

As shown in FIGS. 1, 2, 4, and 7, the attachment hole 41 is positioned in an approximately center of the flange portion 40, passes through up and down, and is formed in a circular shape. As shown in FIGS. 9 and 10, a support leg 80 described hereinafter of the cable clamp 60 is inserted and fixed in the attachment hole 41. Incidentally, although the attachment hole 41 is formed in the circular shape, the attachment hole 41 is not limited to the circular shape, and may be formed in a noncircular shape such as a square and the like.

(Projections 42)

Figure 4:
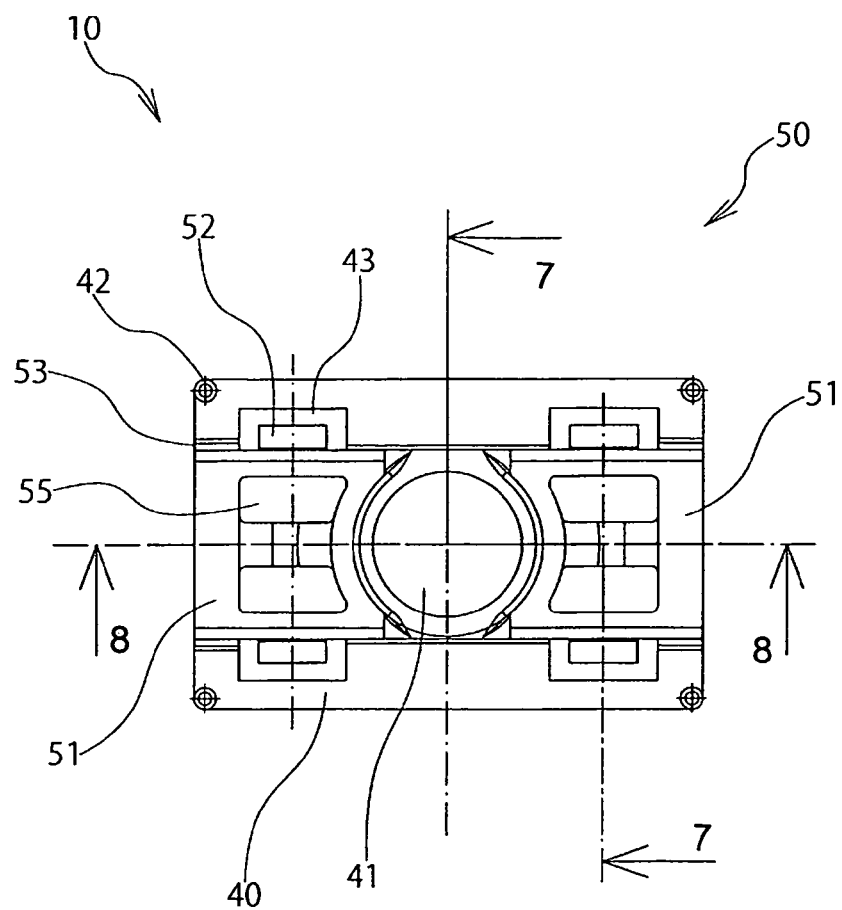
FIG. 4 is a plan view of the grommet (the flange portion and the base leg portion)

As shown in FIGS. 1 and 4, the projections 42 protrude toward the lips 31 from an upper surface of the flange portion 40.

The projections 42 are positioned in four corners of the upper surface of the flange portion 40, and provided with a total of four pieces. The projections 42 are formed in an approximately hemispherical shape whose upper surface is flattened.

Incidentally, although the four pieces of the projections 42 are illustrated as an example of the number of the projections 42, the number of the projections 42 is not limited to four, and may be singular, two, three, or five or above.

Figure 11:
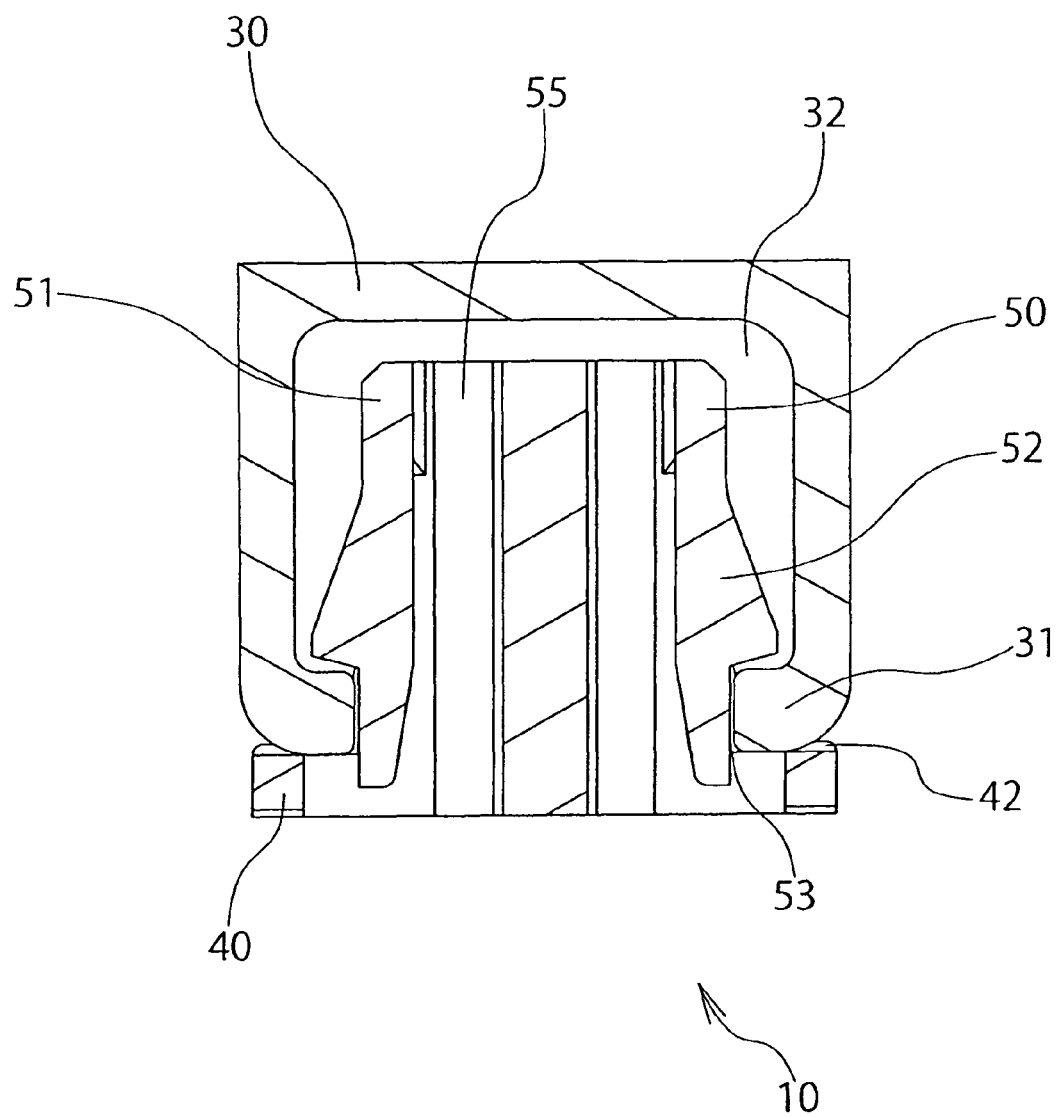
FIG. 11 is a partially enlarged cross-sectional view showing the attachment condition of the grommet.
Figure 12:
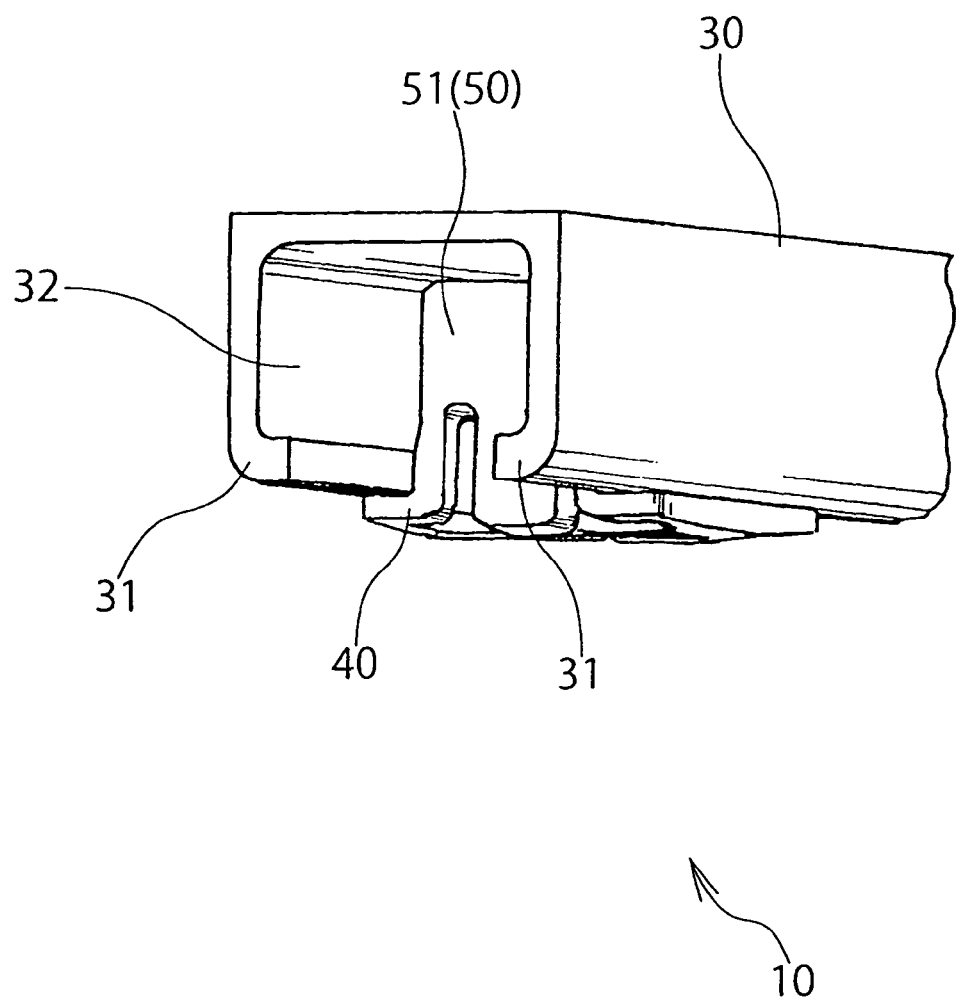
FIG. 12 is a perspective view showing the attachment condition of the grommet (the flange portion and the base leg portion)
Figure 13:
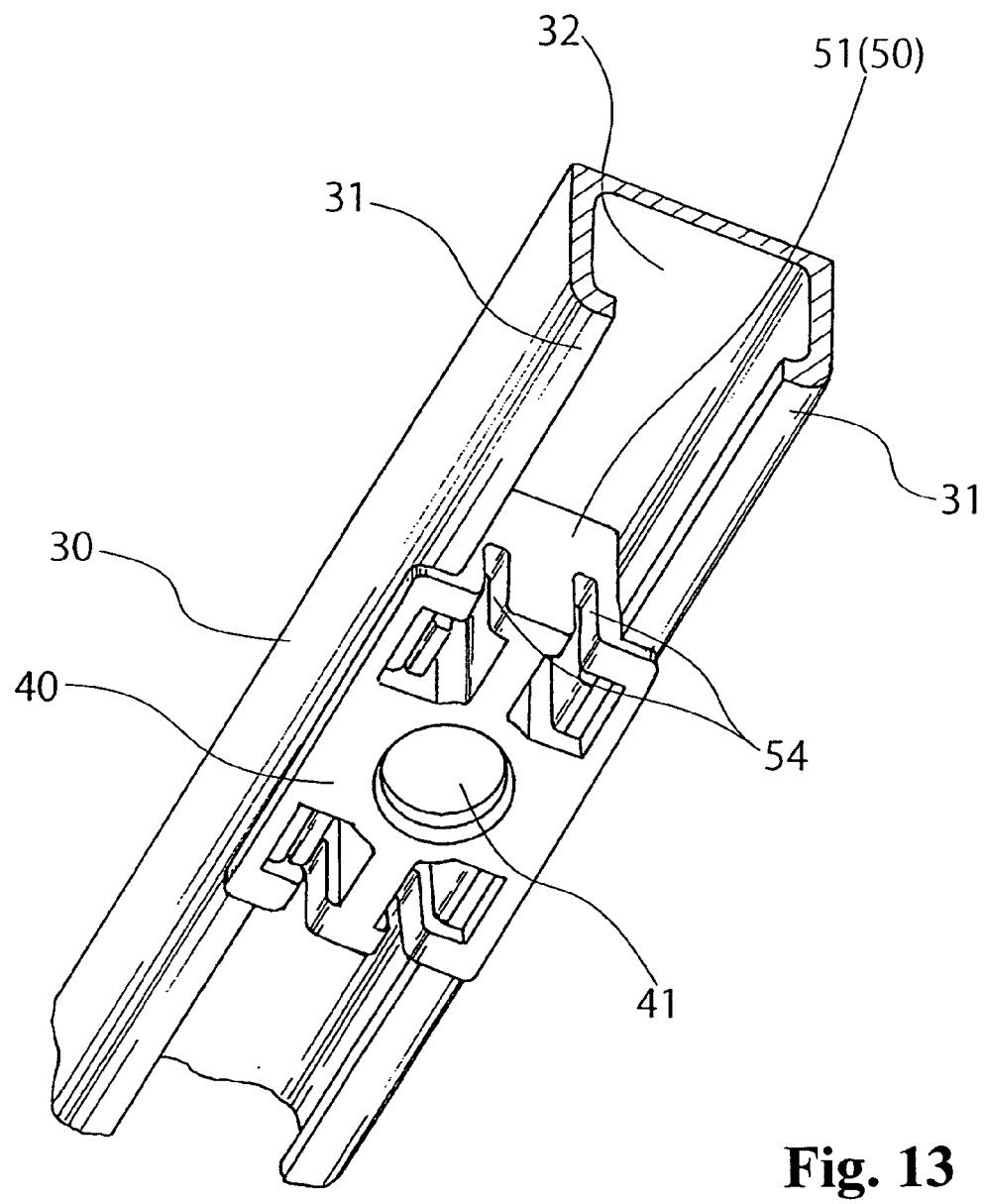
FIG. 13 is the other perspective view showing the attachment condition of the grommet (the flange portion and the base leg portion)

As shown in FIG. 11, the projections 42 abut against lower surfaces of the lips 31 in a state wherein the after-mentioned base leg portion 50 is mounted on the channel-type steel material 30.

(Notch Portions 43)

Figure 5:
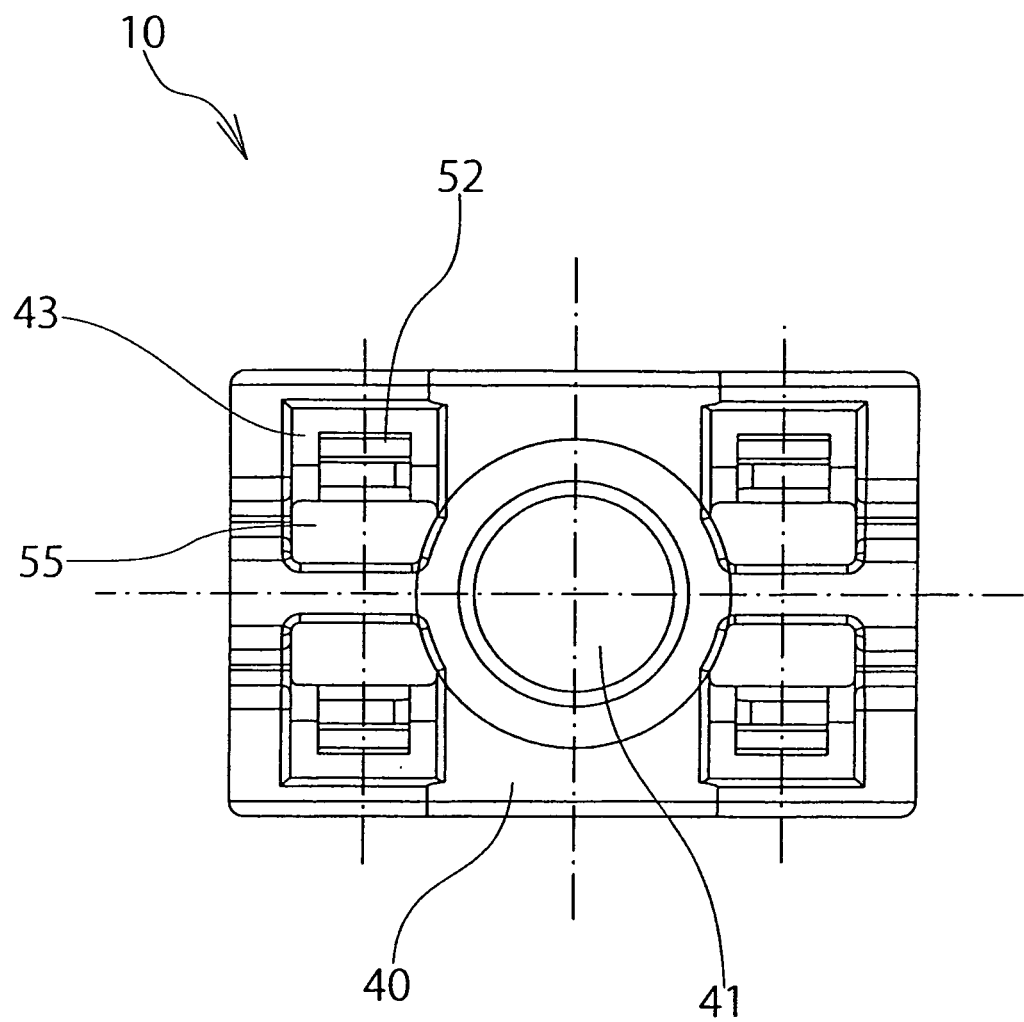
FIG. 5 is a bottom view of the grommet (the flange portion and the base leg portion)

As shown in FIGS. 1, 4, and 5, the notch portions 43 are positioned by bridging the flange portion 40 and the base leg portion 50, and are for providing an elastic force to the projections 42.

The notch portions 43 are formed so as to fringe external surfaces of the after-mentioned elastic leg pieces 52 of the base leg portion 50 in a C shape, and provided with a total of four pieces. The notch portions 43 pass through the flange portion 40 up and down.

Incidentally, although the four pieces of the notch portions 43 are illustrated as an example of the number of the notch portions 43, the number of the notch portions 43 is not limited to four, and may be singular, two, three, or five or above.

(Base Leg Portion 50)

As shown in FIGS. 1, and 9 to 13, the base leg portion 50 is disposed inside the groove portion 32.

The base leg portion 50 protrudes upward from the upper surface of the flange portion 40, and as described above, the base leg portion 50 is integrally formed with the flange portion 40.

As shown in FIGS. 1 to 8, the base leg portion 50 broadly comprises the following respective portions.

Incidentally, the following (1) to (5) will be described hereinafter.

(1) Block portions 51
(2) Elastic leg pieces 52
(3) Bulging portions 53

(4) Slits (5) Hollow portions 55

Incidentally, each portion of the base leg portion 50 is not limited to the (1) to (5).

(Block Portions 51)

As shown in FIGS. 1 to 4 and 8, the block portions 51 protrude in a block shape from the upper surface of the flange portion 40, pass through the inside of the space of the mutually opposed lips 31 of the channel-type steel material 30, and are fitted inside the groove portion 32.

A pair of the block portions 51 is formed by sandwiching the attachment hole 41 of the flange portion 40.

Incidentally, although a pair of the block portions 51 is formed, the block portions 51 are not limited to a pair, and may be singular or three or above.

The block portions 51 are configured to have a width less than that of the space of a pair of the lips 31.

(Elastic Leg Pieces 52)

As shown in FIGS. 1 to 7, the elastic leg pieces 52 are positioned in the base leg portion 50, elastically protrude toward an outside, are bent toward an inside by being pressed by the lips 31 when inserted into the space of the lips 31, and are restored to original state inside the groove portion 32 after passing through the inside of the space of the lips 31 so as to sandwich the lips 31 between the elastic leg pieces 52 and the flange portion 40 from an inside and an outside.

The elastic leg pieces 52 protrude from an outside surface of each block portion 51, and are provided with a total of four pieces. The elastic leg pieces 52 protrude outward from the outside surface of each block portion 51, i.e., the outside surfaces positioned on both sides in a width direction and standing back to back, and are formed in an approximately rectangular triangle shape whose inclined surface faces upward.

Incidentally, although the four pieces are illustrated as an example of the number of the elastic leg pieces 52, the number of the elastic leg pieces 52 is not limited to four, and may be two, three, or five or above.

A space from a pair of the elastic leg pieces 52 which mutually stands back to back to the top is configured to be larger than the space of a pair of the lips 31.

(Bulging Portions 53)

As shown in FIGS. 1 to 4, 6, and 7, the bulging portions 53 are positioned in the base leg portion 50, and bulge toward the lips 31. In the state wherein the base leg portion 50 is mounted on the channel-type steel material 30, the bulging portions 53 abut against end faces of the end portions of the lips 31.

The bulging portions 53 protrude from the outside surface of each block portion 51, and are formed in an approximately trapezoidal shape whose inclined surface faces upward. The bulging portions 53 are disposed so as to be close to the four projections 42 of the flange portion 40, and provided with a total of four pieces.

Incidentally, although the four pieces of the bulging portions 53 are illustrated as an example of the number of the bulging portions 53, the number of the bulging portions 53 is not limited to four, and may be singular, two, three, or five or above.

A space from a pair of the bulging portions 53 which mutually stands back to back to the top is configured to be larger than the space of a pair of the lips 31, and compared to the elastic leg pieces 52, a protruding amount is configured to be small.

(Slits 54)

Figure 2:
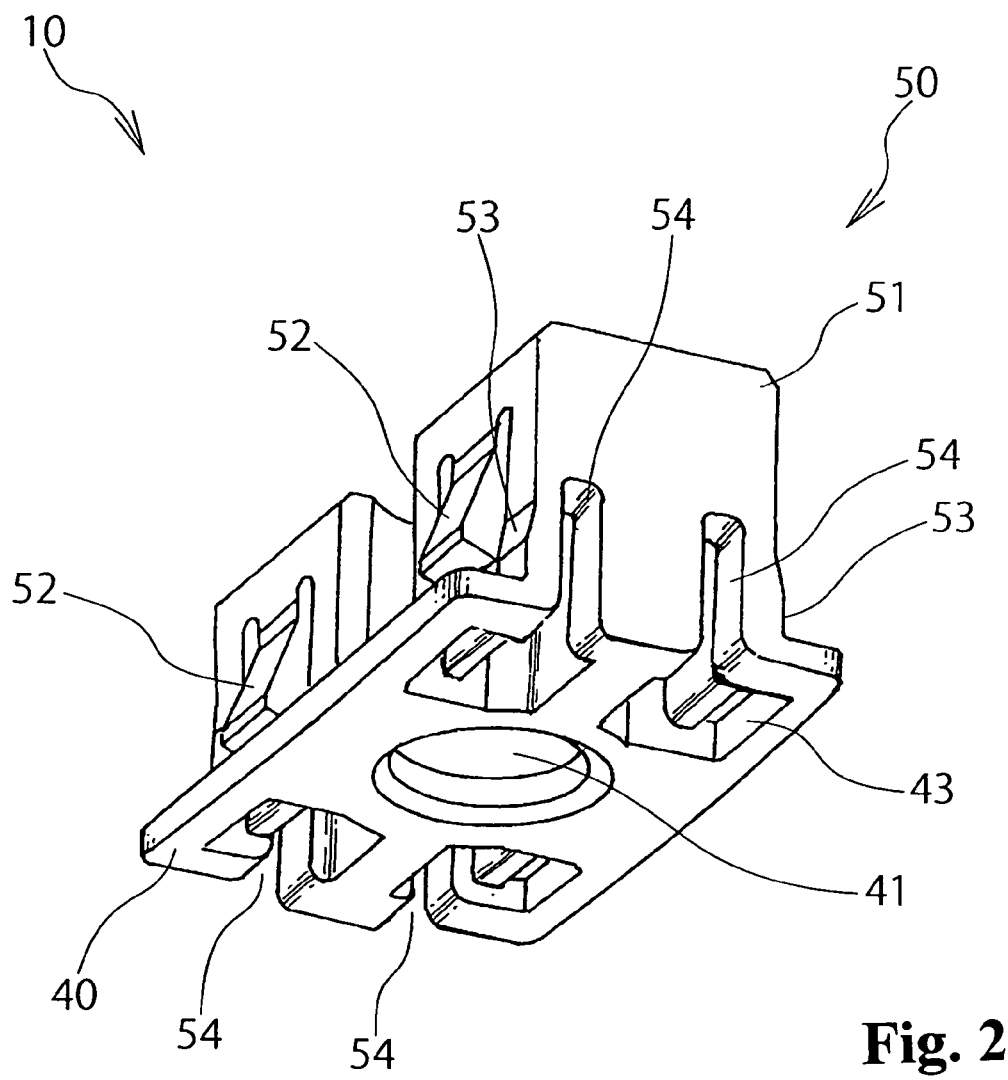
FIG. 2 is a perspective view of the grommet (a flange portion and a base leg portion)
Figure 3:
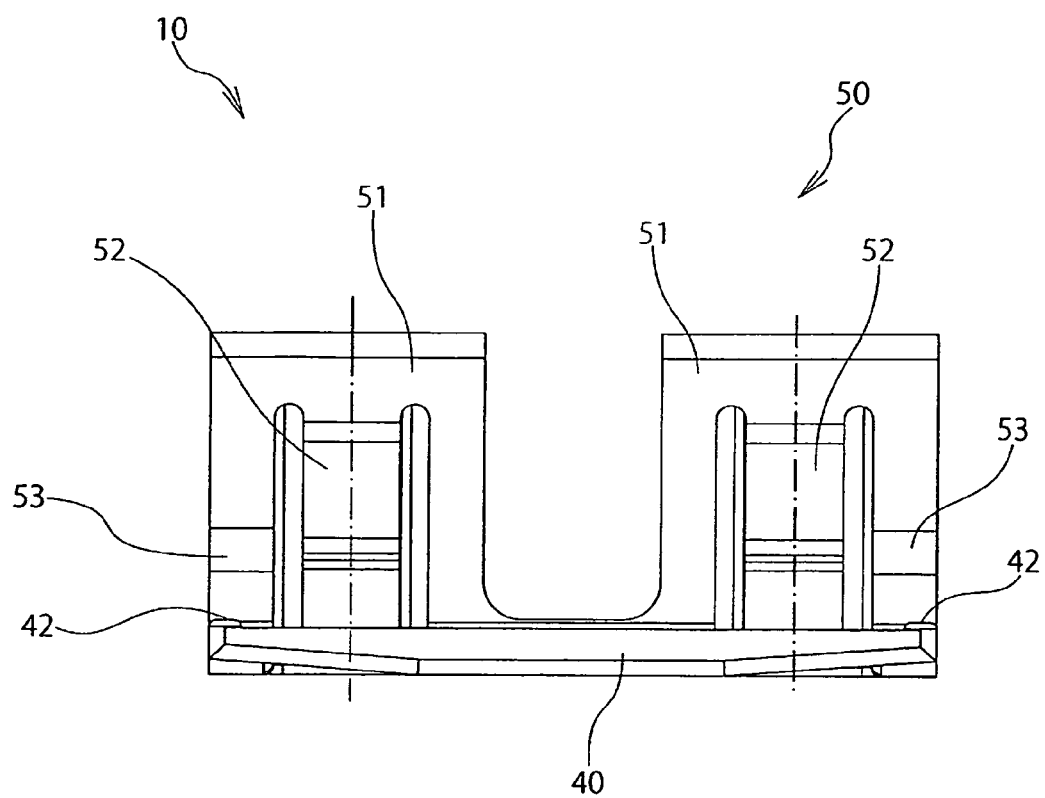
FIG. 3 is a front view of the grommet (the flange portion and the base leg portion)
Figure 6:
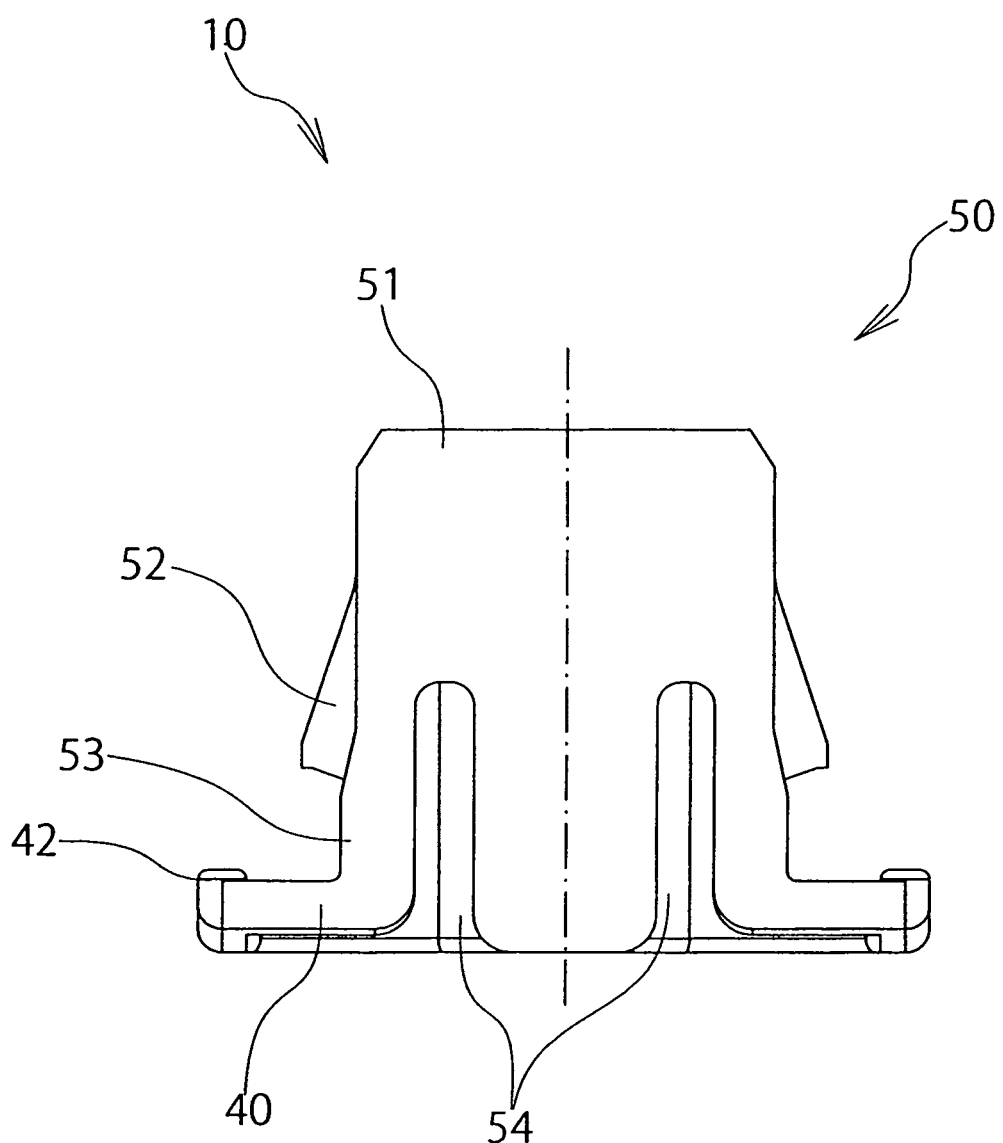
FIG. 6 is a side view of the grommet (the flange portion and the base leg portion)
Figure 7:
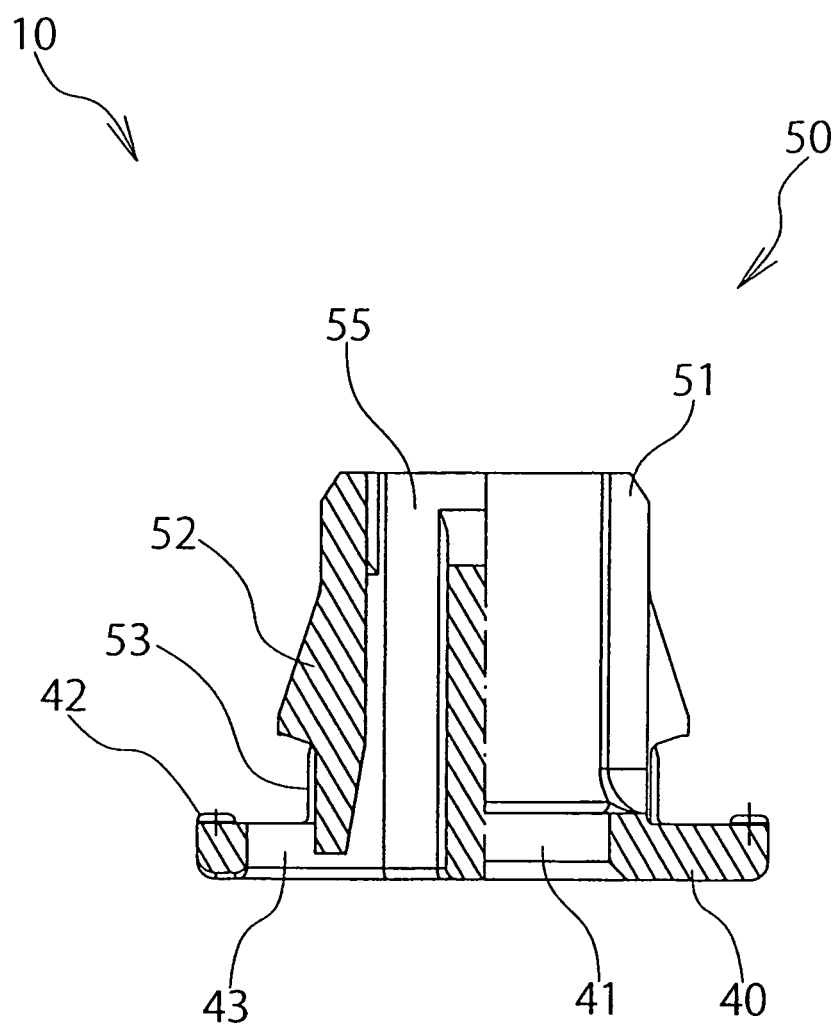
FIG. 7 is a cross-sectional view taken along a line 7-7 in FIG. 4.
Figure 8:
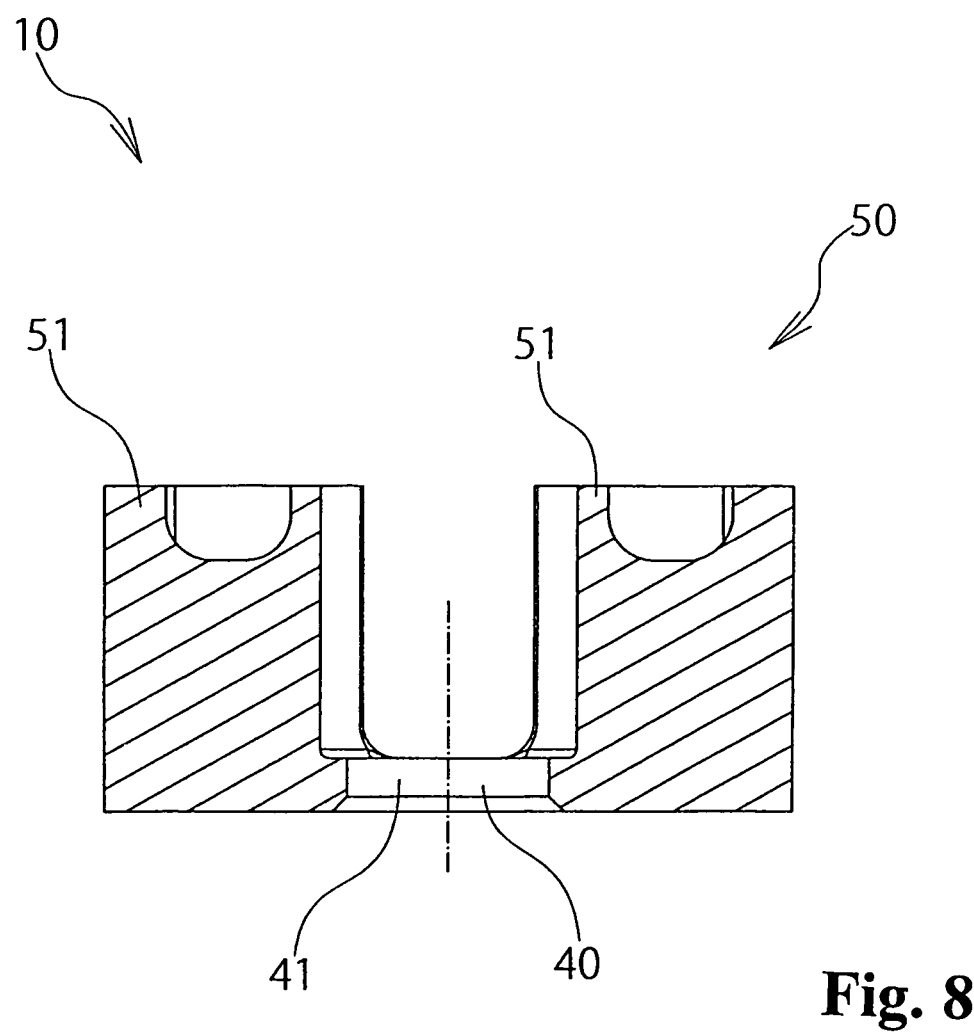
FIG. 8 is a cross-sectional view taken along a line B-B in FIG. 4.

As shown in FIGS. 1, 2, and 6, the slits 54 are positioned in the base leg portion 50, provided on back sides of the bulging portions 53, and provide an elastic force to the bulging portions 53.

The slits 54 are formed in each block portion 51, extend upward toward the block portion 51 from a lower surface of the flange portion 40, and are formed in an approximately U shape whose lower end portion is open. The slits 54 are provided with a total of four pieces in such a way as to be respectively positioned on the back sides of the four bulging portions 53.

Incidentally, although the four pieces of the slits 54 are illustrated as an example of the number of the slits 54, the number of the slits 54 is not limited to four, and may be singular, two, three, or five or above.

(Hollow Portions 55)

As shown in FIGS. 1, 2, 4, 5, and 7, the hollow portions 55 are respectively formed in an inner portion of each block portion 51 so as to allow the elastic leg pieces 52 to bend in.

The hollow portions 55 are formed in a cylindrical shape passing through the flange portion 40 from the block portion 51, and provided with a total of four pieces by corresponding to the four elastic leg pieces 52.

Incidentally, although the four pieces of the hollow portions 55 are illustrated as an example of the number of the hollow portions 55, the number of the hollow portions 55 is not limited to four provided that the number of the hollow portions 55 is the same number of the elastic leg pieces 52.

(Cable Clamp 60 (Locking Device))

As shown in FIGS. 9, 10, 14, and 15, the cable clamp 60 is fixed to the flange portion 40, and locks the cables 20 (object) so as to function as the locking device.

The cable clamp 60 is formed separately from the flange portion 40 and the base leg portion 50, and attached to the flange portion 40. The cable clamp 60 is integrally formed by a thermoplastic synthetic resin such as, for example, "PBT" (polybutylene terephthalate) and the like which has appropriate elasticity and rigidity. Incidentally, although the cable clamp 60 is formed separately from the flange portion 40 and the base leg portion 50, the cable clamp 60 is not limited to the above, and the cable clamp 60 may be integrally formed with the flange portion 40 and the base leg portion 50.

The locking device locks the cables 20 (object) directly, or locks a fixing device (not shown in the figures) such as the holding band and the like of the cables 20 in at least either one of the flange portion 40 or the base leg portion 50. Incidentally, although the cable clamp 60 is illustrated as an example of the locking device, the locking device is not limited to the cable clamp 60. Also, although the cable clamp 60 which is the locking device is fixed by attaching to the flange portion 40, the cable clamp 60 is not limited to the above, and the cable clamp 60 may be fixed by attaching to the base leg portion 50, or by attaching to both the flange portion 40 and the base leg portion 50.

As shown in FIGS. 9, 10, 14, and 15, the cable clamp 60 broadly comprises the following respective portions.

Incidentally, the following (1) to (4) will be described hereinafter.

(1) Base portion 70

(2) Support leg 80

(3) Clamp portion 90

(4) Movable arm 100

Incidentally, each portion of the cable clamp 60 is not limited to the (1) to (4).

(Base Portion 70)

As shown in FIGS. 9, 10, 14, and 15, the base portion 70 is formed in a plate shape long in a width direction of the channel-type steel material 30, and an external shape of the base portion 70 is configured to be larger than the attachment hole 41 of the flange portion 40.

In one end portion in a longitudinal direction of the base portion 70, there is provided a shaft hole 71 supporting the after-mentioned movable arm 100 so as to be capable of pivoting.

The shaft hole 71 passes through laterally, i.e., in a longitudinal direction of the channel-type steel material 30, and is formed in a square shape.

(Support Leg 80)

As shown in FIG. 9, the support leg 80 extends in a cylindrical shape upward from an upper surface in a middle of a length of the base portion 70, and has an external diameter less than or equal to an inner diameter of the attachment hole 41 of the flange portion 40.

In the support leg 80, claw portions 81 elastically protruding toward an outside are provided.

A pair of the claw portions 81 is provided in a diametrical direction of the base portion 70, and outwardly protrudes in a radial direction by mutually standing back to back. The claw portions 81 are bent toward an inside by being pressed by a hole edge of the attachment hole 41 when inserted into the attachment hole 41, and restored to original state inside a space of the block portions 51 after passing the attachment hole 41 so as to sandwich the flange portion 40 between the claw portions 81 and the base portion 70 from above and below.

(Clamp Portion 90)

As shown in FIGS. 9, 10, 14, and 15, the clamp portion 90 connects to the other end portion in a length direction of the base portion 70, and can hold the cables 20.

One end portion of the clamp portion 90 connects to the base portion 70, and the clamp portion 90 is curved in a C shape and extends downwardly. The other end portion of the clamp portion 90 is a free end portion, and positioned downwardly away from the base portion 70 by maintaining a space for inserting the after-mentioned movable arm 100 and the cables 20.

The cables 20, inserted from the space between the free end portion of the clamp portion 90 and the after-mentioned movable arm 100, are placed on an inner peripheral surface of the clamp portion 90, and can be temporarily held.

In the clamp portion 90, a ratchet 91 is provided along a curved length direction thereof. The ratchet 91 engages a lock claw (not shown in the figures) of the after-mentioned movable arm 100.

(Movable Arm 100)

As shown in FIGS. 9, 10, 14, and 15, one end portion of the movable arm 100 is supported by the shaft hole 71 of the base portion 70, and the movable arm 100 pivots along the clamp portion 90 at the center of the shaft hole 71.

In one end portion of the movable arm 100, a projecting shaft 101 fitted in the shaft hole 71 is provided, and the other end portion of the movable arm 100 is a free end portion. In the free end portion, a lock portion 102 having the lock claw (not shown in the figures) engaging the ratchet 91 of the clamp portion 90 is provided.

Although it is not shown in the figures, the lock portion 102 includes a guide groove in a concave shape wherein the clamp portion 90 is fitted in. Although it is also not shown in the figures, the lock claw faces the guide groove, and elastically protrudes toward a tooth of the ratchet 91 of the clamp portion 90 fitted in the guide groove. Although it is also not shown in the figures, the lock portion 102 includes a release lever, and by operating the release lever, the lock claw engaging one tooth of the ratchet 91 is emerged from the tooth so as to be capable of releasing a lock state.

The movable arm 100 maintains a state pivoting upward approximately parallel to the base portion 70 by a frictional resistance between the movable arm 100 and the base portion 70. In the state pivoting upward, the lock portion 102 is positioned upward away from the free end portion positioned in the end portion of the clamp portion 90 while maintaining a space wherein the cables 20 can be inserted.

As shown in FIGS. 14 and 15, when the movable arm 100 is pivoted downwardly at the center of the shaft hole 71 against the frictional resistance between the movable arm 100 and the base portion 70, the free end portion positioned in the end portion of the clamp portion 90 is fitted in the guide groove (not shown in the figures) of the lock portion 102 so as to block the space wherein the cables 20 can be inserted, so that the cables 20 cannot be pulled out of an internal space of the clamp portion 90.

As shown in FIGS. 14 and 15, when the movable arm 100 is pivoted further, the internal space of the clamp portion 90 is narrowed so as to sandwich the cables 20 entered into the internal space of the clamp portion 90 in such a way as to wrap among the movable arm 100, the inner peripheral surface of the clamp portion 90, and a lower surface of the base portion 70.

(Attachment Method of Grommet 10)

Next, a method attaching the grommet 10 with the above-mentioned structure to the channel-type steel material 30 will be explained.

First, the support leg 80 of the cable clamp 60 is inserted into the attachment hole 41 of the flange portion 40 so as to be fixed.

(See FIGS. 9 and 10)

Incidentally, after the support leg 80 is attached to the channel-type steel material 30 on ahead, the cable clamp 60 can be attached.

Next, as shown in FIG. 9, the support leg 80 is inserted upward from underneath toward the groove portion 32 through the inside of the space of the lips 31 of the channel-type steel material 30.

When the support leg 80 is inserted, a pair of the elastic leg pieces 52, protruding from the outside surfaces of the block portions 51 by standing back to back, is pressed alike by a pair of the lips 31 so as to be respectively bent into the hollow portions 55. Consequently, a width of the support leg 80 is narrowed so as to be capable of passing through the inside of the space of a pair of the lips 31. After that, as shown in FIGS. 10 and 11, when the support leg 80 passes through the inside of the space of the lips 31, a pair of the elastic leg pieces 52 is restored to original state inside the groove portion 32 by an elastic restoring force of resin.

Consequently, as shown in FIGS. 10 to 13, the lips 31 are sandwiched from above and below between a pair of the elastic leg pieces 52 which is restored to original state, and the upper surface of the flange portion 40, so that the grommet 10 is fixed to the channel-type steel material 30.

As shown in FIG. 11, in a fixed state of the grommet 10, a pair of the bulging portions 53, protruding from the outside surfaces of the block portions 51 by standing back to back, abuts against the end faces of the end portions of the lips 31.

At this time, the bulging portions 53 are pressed by the end faces of the end portions of the lips 31, and bent toward the slits 54 on the back side, so that the bulging portions 53 elastically abut against the end faces of the end portions of the lips 31.

Consequently, by a frictional force between the bulging portions 53 and the end faces of the end portions of the lips 31, a movement of the grommet 10 in the longitudinal direction of the channel-type steel material 30 can be prevented. Consequently, the grommet 10 can be freely fixed in an arbitrary position in the longitudinal direction of the groove portion 32 of the channel-type steel material 30, i.e., can be freely stopped.

On the other hand, in a case wherein the grommet 10 is required to move in the longitudinal direction of the channel-type steel material 30, when the grommet 10 slides against the frictional force between the bulging portions 53 and the end faces of the end portions of the lips 31, the bulging portions bend toward the slits 54 so as to reduce the frictional force. Consequently, the grommet 10 can slide by a relatively light force.

When a sliding force is released, due to the restoring force of resin, the bulging portions 53 elastically protrude toward the end faces of the end portions of the lips 31 so as to be capable of fixing the grommet 10 again in the position wherein the sliding force is released.

Moreover, in the fixed state of the grommet 10, as shown in FIG. 11, the projections 42 projecting from the upper surface of the flange portion 40 abut against the lower surfaces of the lips 31.

At this time, the projections 42 are pressed by the lower surfaces of the lips 31, so that due to the notch portions 43 positioned by bridging the flange portion 40 and the base leg portion 50, the flange portion 40 bends downward. Accordingly, the projections 42 elastically abut against the lower surfaces of the lips 31.

Consequently, due to the projections 42, wobbling in an up-and-down direction of the grommet 10 inside the channel-type steel material 30 can be prevented. Also, due to the notch portions 43, the projections 42 can elastically abut against the lower surfaces of the lips 31, so that variability of a component accuracy of the channel-type steel material 30 or the grommet 10 can be absorbed.

(Holding Method of Cables 20)

The cables 20 are inserted into the internal space of the clamp portion 90 from the inside of the space between the clamp portion 90 and the movable arm 100, and are placed on the inner-peripheral surface of the clamp portion 90 so as to be capable of being temporarily held.

After that, in order to hold the cables 20, as shown in FIGS. 14 and 15, the movable arm 100 pivots downwardly, and sandwiches the cables 20 in such a way as to wrap among the movable arm 100, the clamp portion 90, and the base portion 70.

At this time, the lock claw (not shown in the figures) of the movable arm 100 engages one tooth of the ratchet 91 of the clamp portion 90, so that the lock portion 102 comes to a lock state.

In order to release the lock state, by operating the release lever (not shown in the figures), the lock claw engaging one tooth of the ratchet 91 is emerged from the tooth so as to release the lock state.

Consequently, by pivoting the movable arm 100 upward, the cables 20 can be removed from the internal space of the clamp portion 90.

The disclosure of Japanese Patent Application No. 2010-246552, filed on Nov. 2, 2010, is incorporated in the application.

While the invention has been explained with reference to the specific embodiments of the invention, the explanation is illustrative and the invention is limited only by the appended claims.

What is claimed is:

1. A grommet for fixing an object along a groove portion of a channel material with lips, comprising:

a base leg portion adapted to be disposed inside the groove portion; and a flange portion extending outwardly from the base leg portion, adapted to be disposed outside the groove portion, wherein the base leg portion comprises elastic leg pieces to elastically protrude outwardly, said elastic leg pieces being arranged such that the elastic leg pieces are bent inwardly by being pressed by the lip when inserted into the groove portion, and restored to an original state inside the groove portion after passing through a space between the lips so as to sandwich the lip between the elastic leg pieces and the flange portion outside of the groove portion, and wherein at least one of the base leg portion and the flange portion includes a locking device for receiving the object or a holding device of the object, wherein the base leg portion includes bulging portions, each being disposed on a side with each of the elastic leg pieces to bulge outwardly, and wherein a space between outer surfaces of the bulging portions is configured to be larger than the space between the lips and less than a distance between outer surfaces of the elastic leg pieces.

2. A grommet according to claim 1, wherein the base leg portion includes a slit on a back side of the bulging portion.

3. A grommet according to claim 1, wherein the flange portion includes a projection disposed on a surface facing one elastic leg piece.

4. A grommet according to claim 3, wherein the flange portion includes a notch portion carrying the one elastic leg piece for providing an elastic force to the projection.

5. A grommet according to claim 1, wherein the base leg portion includes two block portions, each having at least two of the elastic leg pieces, and a hole as the locking device between the two block portions.

6. A grommet according to claim 5, wherein each of the block portions includes a hollow portion and side walls surrounding the hollow portion, each of the side walls opposing each other having a slit extending from the flange portion to form one elastic leg piece.

7. A grommet according to claim 1, wherein the bulging portion has a trapezoidal shape having an inclined surface facing upward.

8. A grommet for fixing an object along a groove portion of a channel material with lips, comprising:

a base leg portion adapted to be disposed inside the groove portion; and a flange portion extending outwardly from the base leg portion, adapted to be disposed outside the groove portion, wherein the base leg portion comprises an elastic leg piece to elastically protrude outwardly, said elastic leg piece being arranged such that the elastic leg piece is bent inwardly by being pressed by the lip when inserted into the groove portion, and restored to an original state inside the groove portion after passing through a space between the lips so as to sandwich the lip between the elastic leg piece and the flange portion outside of the groove portion, wherein at least one of the base leg portion and the flange portion includes a locking device for receiving the object or a holding device of the object, and wherein the flange portion includes a projection disposed on a surface facing the elastic leg piece.

9. A grommet for fixing an object along a groove portion of a channel material with lips, comprising:

a base leg portion adapted to be disposed inside the groove portion; and a flange portion extending outwardly from the base leg portion, adapted to be disposed outside the groove portion, wherein the base leg portion comprises an elastic leg piece to elastically protrude outwardly, said elastic leg piece being arranged such that the elastic leg piece is bent inwardly by being pressed by the lip when inserted into the groove portion, and restored to an original state inside the groove portion after passing through a space between the lips so as to sandwich the lip between the elastic leg piece and the flange portion outside of the groove portion, wherein at least one of the base leg portion and the flange portion includes a locking device for receiving the object or a holding device of the object, wherein the base leg portion includes two block portions, each having at least two of the elastic leg piece, and a hole as the locking device between the two block portions, and wherein each of the block portions includes a hollow portion and side walls surrounding the hollow portion, each of the side walls opposing each other and having a slit extending from the flange portion to form the elastic leg piece.

* * * * *